United States Patent
Mangadlao et al.

(10) Patent No.: US 11,452,950 B2
(45) Date of Patent: Sep. 27, 2022

(54) DEMULSIFYING ADDITIVE FOR SEPARATION OF OIL AND WATER

(71) Applicant: Baker Hughes, a GE company, LLC, Houston, TX (US)

(72) Inventors: Joey D. Mangadlao, Agusan del Sur (PH); Wojciech Jakubowski, Sugar Land, TX (US); Bruce O. Horne, Sugar Land, TX (US); Mary Jane Legaspi Felipe, Sugar Land, TX (US); Jorge E. Ramos, Katy, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 374 days.

(21) Appl. No.: 16/521,204

(22) Filed: Jul. 24, 2019

(65) Prior Publication Data
US 2021/0023475 A1  Jan. 28, 2021

(51) Int. Cl.
*B01D 17/04* (2006.01)
*C10G 33/04* (2006.01)

(52) U.S. Cl.
CPC .......... *B01D 17/047* (2013.01); *C10G 33/04* (2013.01); *C10G 2300/80* (2013.01)

(58) Field of Classification Search
CPC .............................. C10G 33/04; B01D 17/047
See application file for complete search history.

(56) References Cited

U.S. PATENT DOCUMENTS

| 4,507,466 | A | * | 3/1985 | Tomalia | C07C 233/78 528/332 |
|---|---|---|---|---|---|
| 4,568,737 | A | * | 2/1986 | Tomalia | C08G 69/48 528/332 |
| 4,885,110 | A | | 12/1989 | Boese et al. | |
| 7,018,957 | B2 | | 3/2006 | Becker | |
| 8,198,337 | B2 | | 6/2012 | Falk et al. | |
| 2005/0203193 | A1 | | 9/2005 | Leinweber et al. | |
| 2007/0100002 | A1 | * | 5/2007 | Leinweber | C08G 63/20 516/179 |
| 2009/0197978 | A1 | | 8/2009 | Patel et al. | |
| 2011/0272327 | A1 | | 11/2011 | Bruchmann et al. | |
| 2013/0261227 | A1 | | 10/2013 | Nguyen | |
| 2014/0228456 | A1 | | 8/2014 | Bevinakatti et al. | |
| 2014/0243464 | A1 | | 8/2014 | Debord et al. | |

FOREIGN PATENT DOCUMENTS

WO  2004050801 A1  6/2004

OTHER PUBLICATIONS

Zhang, Lifeng, et al., "Methacrylated Hyperbranched Polyglycerol as a High-Efficiency Demulsifier for Oil-in-Water Emulsions", Energy & Fuels, 30 (11), pp. 9939-9946, Oct. 2016.

* cited by examiner

*Primary Examiner* — Renee Robinson
(74) *Attorney, Agent, or Firm* — Crowe & Dunlevy, P.C.

(57) ABSTRACT

A demulsifying additive comprising a branched aliphatic compound may be introduced to a stream containing mixtures of or emulsions of oil and water in an effective amount to separate water from the oil in the stream, such as separating oil from emulsified oil-in-water and/or separating water from emulsified water-in-oil in a production fluid. The branched aliphatic compound may be grafted with a polyether via a crosslinking reaction. Alternatively, branched aliphatic compounds may be crosslinked together.

8 Claims, 4 Drawing Sheets

DEMULSIFYING ADDITIVE FOR SEPARATION OF OIL AND WATER

TECHNICAL FIELD

The present invention relates to an additive useful for separating mixtures of or emulsions of oil and water in a fluid stream, and more particularly relates to introducing a demulsifying additive comprising a branched aliphatic compound to an oilfield fluid stream containing a mixture of oil and water, such as emulsions of oil and water, to separate the water from the oil within the stream.

BACKGROUND

To date, a variety of methods have been developed to help break oil/water emulsions and separate the water from the oil in fluid streams accompanying the production and refining of oil from subterranean reservoirs to improve the quality of the oil recovered from subterranean reservoirs and the quality of the separated water.

The most common method of emulsion treatment in production and refining operations is adding chemical demulsifiers to the oilfield fluid stream. These chemicals are designed to neutralize the stabilizing effect that the natural surfactants found in crude oil, such as asphaltenes and paraffins, have on oilfield emulsions. Chemical demulsifiers are surface-active compounds that, when added to the emulsion, migrate to the oil/water interface, rupture or weaken the rigid film, and enhance water droplet coalescence for easier removal of water from oil in a fluid stream containing mixtures or emulsions of oil and water.

Given the increasing global demands for oil and tightening environmental requirements for disposal of water, there is an ongoing need to develop more efficient and cost-effective treatments for separating oil from water in streams containing oil/water mixtures and emulsions in order to optimize oil recovery and to make sure that such streams may be properly processed and meet the standards set for discharge or reuse.

SUMMARY

There is provided, in one form, a method for separating oil and water in a stream containing a mixture of oil and water, in which an effective amount of a demulsifying additive comprising a branched aliphatic compound is introduced to the stream containing the mixture of oil and water to separate the water from the oil in the stream, and separating water from the oil. The branched aliphatic compound may contain 20 or more carbon atoms.

There is further provided in another non-limiting form, a treated stream comprising a stream containing a mixture of oil and water and a demulsifying additive comprising a branched aliphatic compound. The amount of demulsifying additive may range from about 1 ppm to about 3000 ppm of the treated stream.

In one non-limiting embodiment, the branched aliphatic compound is grafted with a polyether via a crosslinking reaction, wherein the polyether is a polymer of ethylene oxide, propylene oxide, butylene oxide, and combinations thereof.

DETAILED DESCRIPTION

Figure 1:
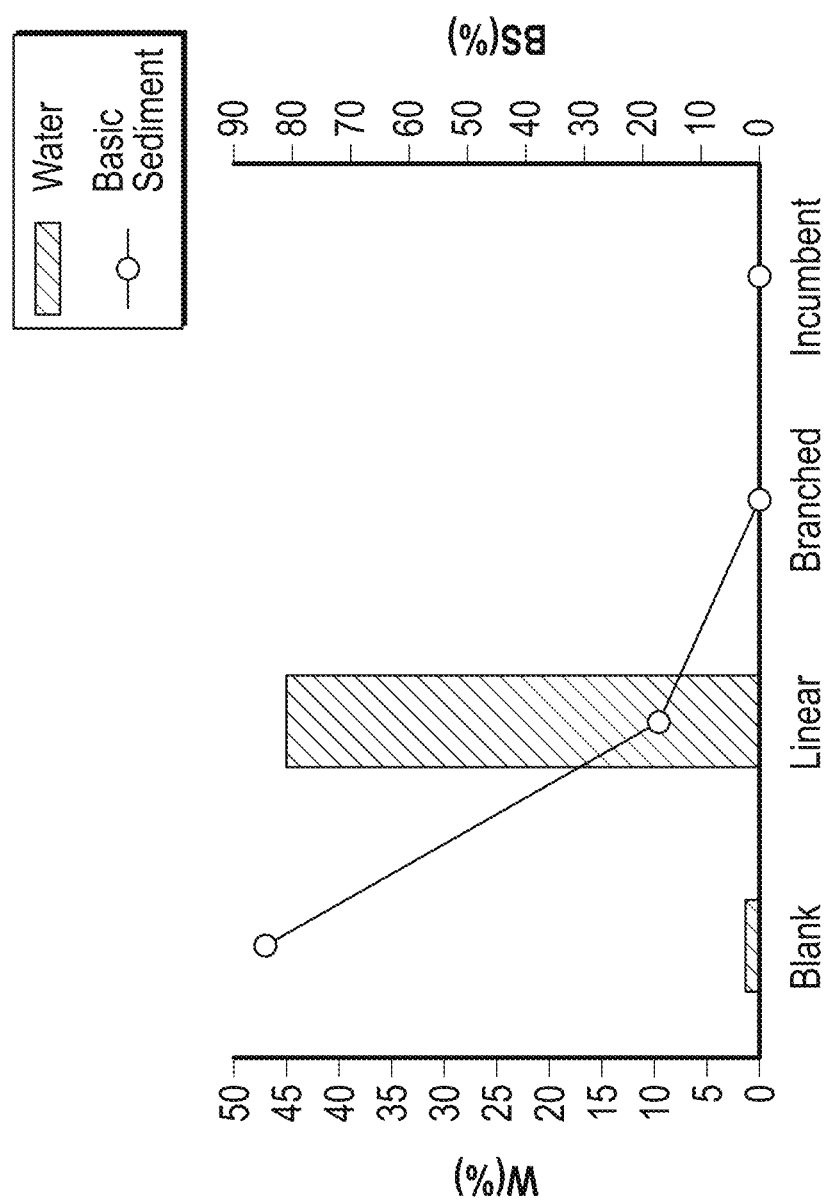
FIG. 1 is a graphic illustration comparing the Basic Sediment percentage (BS %) & Water percentage (W %) of laboratory-tested samples of: crude oil from the Gulf of Mexico ("GoM") containing a branched aliphatic demulsifying additive of the kind disclosed herein, the GoM crude oil containing a linear aliphatic demulsifying additive, the GoM crude oil containing an incumbent demulsifying additive, and the GoM crude oil containing no treatment additive.

It has been discovered that a demulsifying additive comprising a long-chain branched aliphatic compound grafted with a polyether is useful for separating oil from water in an oilfield fluid stream containing a mixture of oil and water or emulsions of oil and water. In particular, the branched and grafted polymer architecture of such a demulsifying additive has been shown to confer a wider array of properties and functionality that makes it more effective in breaking emulsions and separating water and oil in oilfield fluid streams.

In a non-limiting embodiment, demulsifying additive comprises a branched aliphatic compound having 20 or more carbon atoms. The branches of the aliphatic chain may be composed of functional groups made up of 2 to 28 carbon atoms each. The branches may have different carbon numbers from each other. Examples of such functional groups include, but are not limited to, alkyl groups having 2 to 28 carbon atoms, arylalkyl groups having 2 to 28 carbon atoms, cycloalkyl groups having 2 to 28 carbon atoms, and combinations thereof. The long-chain branched aliphatic compound may additionally, or in the alternative, comprise branches having functional groups selected from the group consisting of oxygen functional groups, nitrogen functional groups, sulfur functional groups, phosphorous functional groups, and combinations thereof. In one non-restrictive embodiment, the branched aliphatic compound may be crosslinked with one or more other branched aliphatic compound to give a dendrimer or hyperbranched aliphatic compound. It is appreciated by one of ordinary skill in the art that a hyperbranched aliphatic may have a random or defined hierarchical structure. A dendrimer may be considered to be a hyperbranched aliphatic compound with a defined hierarchical structure.

In another non-limiting embodiment, the demulsifying additive comprises a branched aliphatic compound having 20 or more carbon atoms that is grafted with a polyether. The polyethers that may be grafted upon the long chain branched aliphatic compound include, without limitation, polymers of ethylene oxide ("EO"), polymers of propylene oxide ("PO"), polymers of butylene oxide, and combinations thereof. The polyether-grafted branched aliphatic compound may be formed through a crosslinking reaction involving an epoxide opening to achieve the desired architecture. The crosslinking reaction may be base-catalyzed, acid-catalyzed, or uncatalyzed. The crosslinkers useful in forming the polyether-grafted branched aliphatic compound may include one or more of the following: an epoxide, an isocyanate, a carboxylic acid, an acyl halide, an aldehyde, a nitrile, a halide, an ester, an anhydride, an alcohol, an amine, and an amide.

Specific examples of branched aliphatic compounds grafted with a polyether through a crosslinking reaction, which may be useful in a demulsifying additive for separating oil from water in an oilfield fluid stream containing a mixture of oil and water or emulsions of oil and water, include, without limitation, an EO-PO grafted C20+ branched aliphatic.

The stream to be treated with the demulsifying additive of the present disclosure may be any stream containing a mixture of oil and water or emulsions of oil and water. In one non-limiting embodiment, the oil may be dispersed within the water phase of the stream or the water may be dispersed within the oil phase of the stream. Stated another way, the water or oil may be emulsified within the other phase such that the stream contains oil-in-water (o/w) emulsions and/or water-in-oil (w/o) emulsions. The water phase of the stream may be comprised of brine, seawater, and/or fresh water. Examples of such streams in the oilfield environment in which it would be beneficial to separate the oil from the water include, but are not limited to, crude oil, a production fluid, a drilling fluid, a completion fluid, a fracturing fluid, an injection fluid, a flowback fluid, and combinations thereof. In another non-restrictive embodiment, the stream is a fluid produced from a subterranean reservoir comprising mixtures or emulsions of oil and water. In an alternative, non-restrictive version, the stream containing oil and water is generated in the refining of crude oil or natural gas.

A goal of the method is to separate the oil from the water (or the water from the oil) in the stream to maximize oil recovery and to clarify the water in the stream to an acceptable level for the separated water to be discharged to the environment or reused. While complete separation of the oil from the water is desirable, it should be appreciated that complete separation is not necessary for the methods and additives discussed herein to be considered effective. Success is obtained if more water is separated from the oil or vice versa using an effective amount of the demulsifying additive of the present disclosure than in the absence of an effective amount of it. In a non-limiting embodiment, the effective amount of the single-phase microemulsion additive that may be introduced to the stream for purposes of separating oil from water or separating the water from the oil in the stream, as these terms are defined herein, ranges from about 1 ppm independently to about 3,000 ppm independently, or from about 10 ppm independently to about 250 ppm independently, based on the total volume of the stream. As used herein with respect to a range, "independently" means that any threshold given may be used together with any other threshold given to provide a suitable alternative range.

In another non-limiting embodiment, other additives may be added to the stream for treatment including, but not necessarily limited to, coagulants, flocculants, corrosion inhibitors, and/or viscosity modifiers. In addition or alternatively, other chemicals, such as friction reducers, scale inhibitors, paraffin inhibitors, pour point depressants, asphaltene inhibitors, clay swelling inhibitors, biocides, antifoulants, flow back aids, and/or surfactants, may be added during treatment with the branched demulsifying additive of the kind disclosed herein.

The invention will be further described with respect to the following Examples, which is not meant to limit the invention, but rather to further illustrate some embodiments.

EXAMPLES

Example 1

FIG. 1 is a graphic illustration comparing the Basic Sediment percentage (BS %) & Water percentage (W %) of laboratory-tested samples of the following: Crude oil from the Gulf of Mexico (GoM) containing a EO-PO grafted C20+ branched aliphatic ("Branched"), the same GoM crude oil containing EO-PO grafted C20+ linear aliphatic ("Linear"), the GoM crude oil containing an EO-PO-based incumbent demulsifying additive ("Incumbent"), and the GoM crude oil containing no treatment additive ("Blank").

The GoM crude oil in each sample is known to contain 50-60 vol % water. The performance of the demulsifying additive in each sample was evaluated by determining the % Basic Sediment & Water ("BS&W"), which is a measure of how much water, starting out either in free or emulsion form, was separated from the crude oil. The lower the % BS&W, the better the water removal.

The data in FIG. 1 indicate that the demulsifying additive comprising the Branched aliphatic performed better than the demulsifying additive comprising the Linear aliphatic and that the performance of the demulsifying additive comprising the Branched aliphatic was comparable to the Incumbent.

Example 2

The photographs in FIG. 2 show the bottle performance of a demulsifier package containing an EO-PO-based incumbent demulsifying additive ("Incumbent DMO") and a demulsifier package containing EO-PO grafted C20+ branched aliphatic ("Branched DMO") when applied to samples of GoM crude raw emulsion. For purposes of this disclosure, "DMO" is an acronym referring to demulsifiers that are oil-soluble.

Figure 2A:
FIGS. 2A and 2B are photographic illustrations comparing the bottle performance of a demulsifier package containing an incumbent demulsifying additive and a demulsifier package containing a branched aliphatic demulsifying additive of the kind disclosed herein when applied to a GoM crude oil raw emulsion.
Figure 2B:
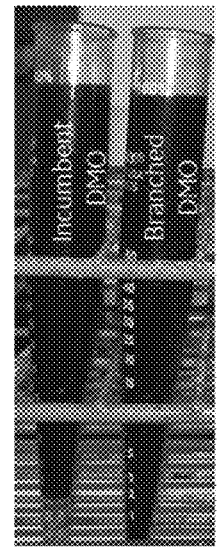

Photograph in FIG. 2A shows that the Branched DMO causes the water to drop out of a sample of raw emulsion from GoM crude equally as well as the Incumbent DMO. Photograph in FIG. 2B shows that the Branched DMO dries the sample better than the Incumbent DMO.

Figure 3:
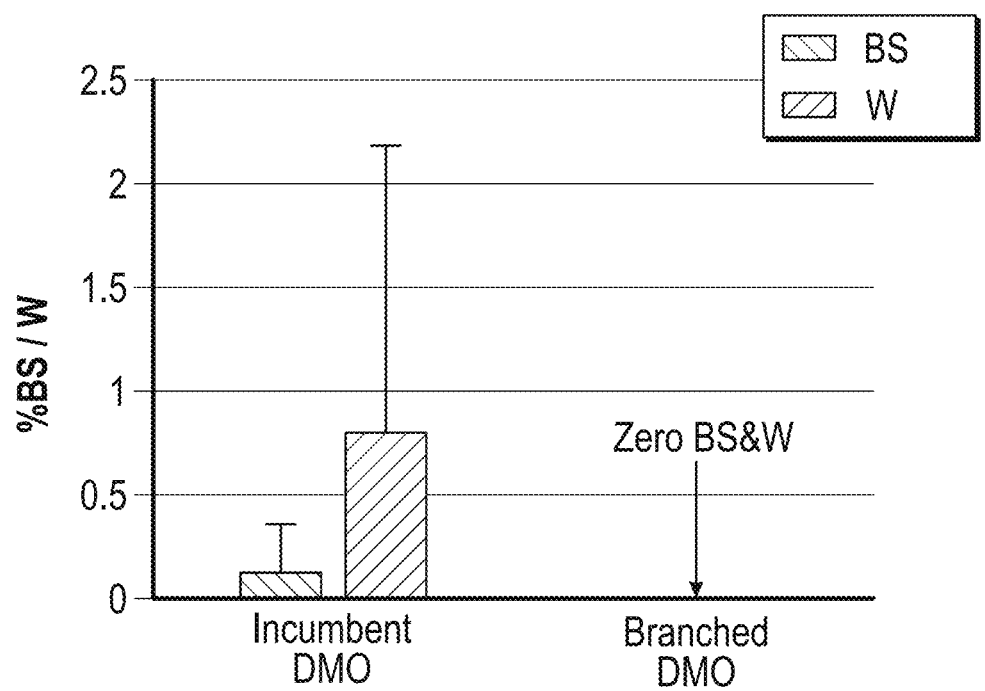
FIG. 3 is a graphic illustration comparing the Basic Sediment percentage (BS %) & Water percentage (W %) of laboratory-prepared samples of: a GoM crude raw emulsion containing a demulsifier package with an incumbent demulsifying additive and a GoM crude raw emulsion containing a demulsifier package with a branched aliphatic demulsifying additive of the kind disclosed herein.

The same GoM crude raw emulsion samples were tested to determine the BS&W % measurement for each demulsifier package. The data in FIG. 3 indicate that the Branched DMO performed much better than the Incumbent DMO in removing or separating water from the samples.

Example 3

Figure 4:
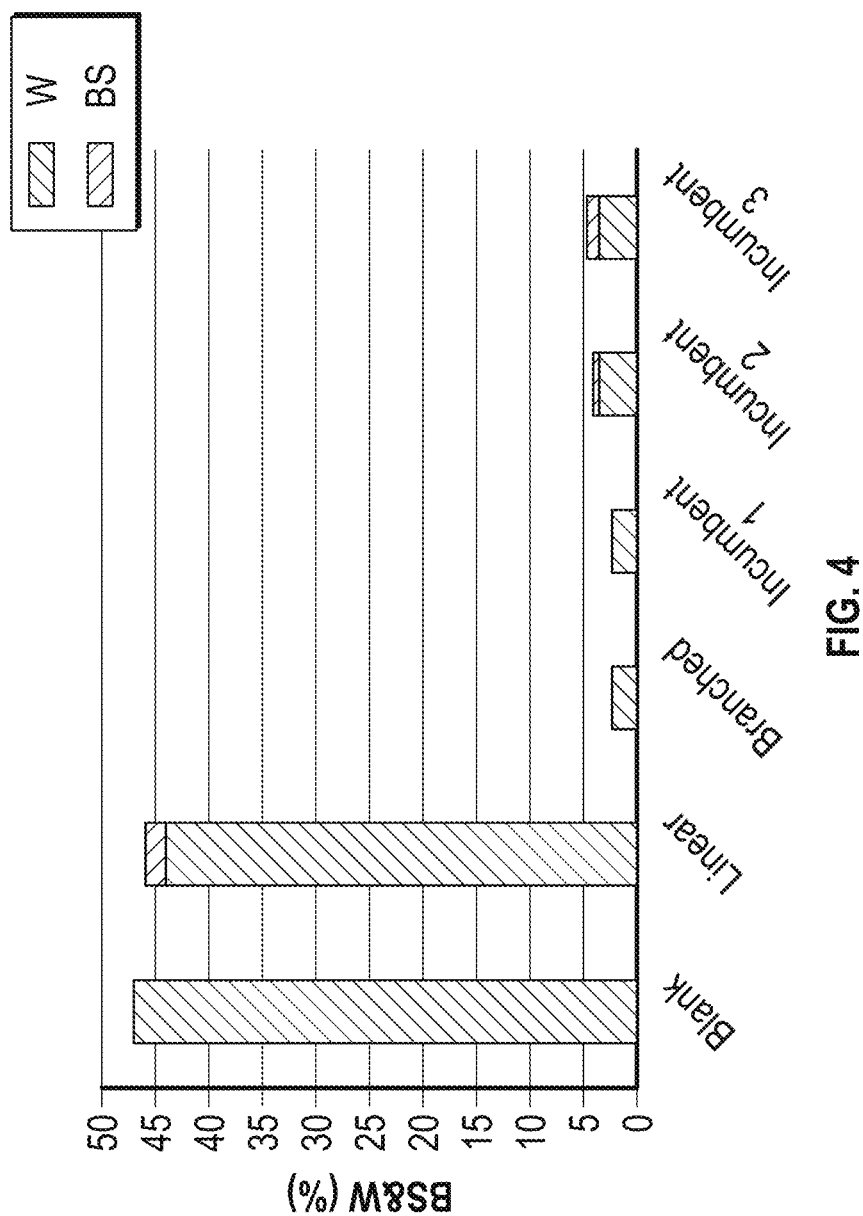
FIG. 4 is a graphic illustration comparing the Basic Sediment & Water percentage (BS&W %) of field-tested samples of: a California crude oil containing a branched aliphatic demulsifying additive of the kind disclosed herein, the California crude oil containing a linear aliphatic demulsifying additive, the California crude oil containing various incumbent demulsifying additives, and the California crude oil containing no treatment additive.

FIG. 4 is a graphic illustration comparing the Basic Sediment percentage (BS %) & Water percentage (W %) of laboratory-tested samples of the following: crude oil from California containing a EO-PO grafted C20+ branched aliphatic ("Branched"), the California crude oil containing EO-PO grafted C20+ linear aliphatic ("Linear"), the California crude oil containing various EO-PO-based incumbent demulsifying additives ("Incumbents 1, 2, and 3"), and the California crude oil containing no treatment additive ("Blank").

The data in FIG. 4 indicate that the demulsifying additive comprising the Branched aliphatic performed better than the demulsifying additive comprising the Linear aliphatic and that the performance of the demulsifying additive comprising the Branched aliphatic was comparable to the Incumbents.

In the foregoing specification, the invention has been described with reference to specific embodiments thereof, and has been described as effective in providing methods, additives, and treatments for separating oil and water from mixtures thereof. However, it will be evident that various modifications and changes can be made thereto without departing from the broader spirit or scope of the invention as set forth in the appended claims. Accordingly, the specification is to be regarded in an illustrative rather than a restrictive sense. For example, streams, demulsifiers, branched aliphatic compounds, functional groups, crosslinkers, emulsions, mixtures, and composition and amounts of additive falling within the claimed parameters, but not specifically identified in this disclosure or evaluated in a particular Example, are expected to be within the scope of this invention.

The present invention may suitably comprise, consist or consist essentially of the elements disclosed and may be practiced in the absence of an element not disclosed. For instance, the method or treated stream may comprise, consist essentially of, or consist of the steps or components recited in the independent claims, respectively.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for separating oil and water in a stream containing a mixture of oil and water, the method comprising:
    introducing from about 1 ppm to about 3000 ppm based on volume of the stream of an amount of a demulsifying additive comprising a branched aliphatic compound to the stream containing the mixture of oil and water to separate the water from the oil in the stream, wherein the branched aliphatic compound comprises branches, each branch consists of aliphatic alkyl functional groups containing 2 to 28 carbon atoms and optionally additionally functional groups selected from the group consisting of oxygen functional groups, nitrogen functional groups, sulfur functional groups, phosphorus functional groups, and combinations thereof, wherein the branched aliphatic compound is grafted with a polyether selected from a group consisting of a polymer of ethylene oxide, a polymer of propylene oxide, a polymer of butylene oxide, and combinations thereof and wherein the branched aliphatic compound grafted with a polyether is a crosslinked branched aliphatic compound; and wherein the branched aliphatic compound has 20 or more carbon atoms; and
    separating the water from the oil.

2. The method of claim 1, wherein the stream comprises emulsions of oil and water.

3. The method of claim 1, wherein the stream containing a mixture of oil and water is selected from a group consisting of crude oil, a production fluid, a drilling fluid, a completion fluid, a fracturing fluid, an injection fluid, a flowback fluid, and combinations thereof.

4. The method of claim 1, wherein the crosslinked branched aliphatic compound is formed by using a crosslinker selected from the group consisting of an epoxide, an isocyanate, a carboxylic acid, an acyl halide, an aldehyde, a nitrile, a halide, an ester, an anhydride, an alcohol, an amine, an amide, and combinations thereof.

5. The method of claim 4 wherein the crosslinker is an epoxide.

6. A method for separating oil and water in a stream containing a mixture of oil and water, the method comprising:
    introducing an effective amount of a demulsifying additive comprising a branched aliphatic compound to the stream containing the mixture of oil and water to separate the water from the oil in the stream, wherein the stream comprises emulsions of oil and water, wherein the branched aliphatic compound comprises branches, each branch consists of aliphatic alkyl functional groups containing 2 to 28 carbon atoms and optionally additionally functional groups selected from the group consisting of oxygen functional groups, nitrogen functional groups, sulfur functional groups, phosphorus functional groups, and combinations thereof, wherein the branched aliphatic compound has 20 or more carbon atoms; wherein the branched aliphatic compound is grafted with a polyether, and wherein the branched aliphatic compound grafted with a polyether is a crosslinked branched aliphatic compound formed by using a crosslinker that is an epoxide; and
    separating the water from the oil.

7. The method of claim 6, wherein the polyether is selected from a group consisting of a polymer of ethylene oxide, a polymer of propylene oxide, a polymer of butylene oxide, and combinations thereof.

8. The method of claim 6, wherein the effective amount of the demulsifying additive introduced to the stream ranges from about 1 ppm to about 3000 ppm based on volume of the stream.

* * * * *